United States Patent [19]

Wasa et al.

[11] Patent Number: 4,800,978
[45] Date of Patent: Jan. 31, 1989

[54] MAGNETIC OBJECT DETECTING SYSTEM FOR AUTOMATED GUIDED VEHICLE SYSTEM

[75] Inventors: Yasuhiro Wasa; Yojiro Kondo; Tokuki Miura, all of Tokyo, Japan

[73] Assignee: NEC Corporation, Tokyo, Japan

[21] Appl. No.: 796,209

[22] Filed: Nov. 8, 1985

[30] Foreign Application Priority Data

Nov. 9, 1984 [JP]  Japan ........................ 59-170161[U]
Jan. 24, 1985 [JP]  Japan ........................ 60-11251

[51] Int. Cl.⁴ ............................................. B62D 1/28
[52] U.S. Cl. .................................... 180/168; 104/284; 318/580; 318/587; 324/207; 324/208; 336/119
[58] Field of Search ............... 180/168, 169; 318/38, 318/567, 687, 587, 135, 568, 580, 576; 340/904, 905, 933, 941; 324/207, 208, 251, 173, 174; 336/117–119, 129, 132, 133; 310/12, 15; 104/284, 286, 293

[56] References Cited

U.S. PATENT DOCUMENTS

| | | | |
|---|---|---|---|
| 3,085,646 | 4/1963 | Paufve | 180/168 |
| 3,198,279 | 8/1965 | Quinn | 180/168 |
| 3,210,683 | 10/1965 | Pay | 330/254 |
| 3,697,745 | 10/1972 | Bolton | 324/207 |
| 3,911,389 | 10/1975 | Mills | 340/941 |
| 4,065,725 | 12/1977 | Lillis et al. | 330/254 |
| 4,092,554 | 5/1978 | Quinn | 310/13 |
| 4,219,092 | 8/1980 | Richter | 318/587 |
| 4,236,093 | 11/1980 | Birnbaum | 324/207 |
| 4,303,883 | 12/1981 | Mori et al. | 324/208 |

FOREIGN PATENT DOCUMENTS

| | | | |
|---|---|---|---|
| 121007 | 10/1984 | European Pat. Off. | 324/207 |
| 2435494 | 2/1976 | Fed. Rep. of Germany | 318/587 |

Primary Examiner—David M. Mitchell
Assistant Examiner—Eric Culbreth
Attorney, Agent, or Firm—Burns, Doane, Swecker & Mathis

[57] ABSTRACT

An improved magnetic object detecting system having high sensitivity and noise immunity is disclosed.

The detection system is of the type having a stimulation coil for generating a magnetic field and a pair of magnetic field detection coils, and the stimulation coil is of a magnetic core type employing a magnetic core.

4 Claims, 9 Drawing Sheets

4,800,978

MAGNETIC OBJECT DETECTING SYSTEM FOR AUTOMATED GUIDED VEHICLE SYSTEM

BACKGROUND OF THE INVENTION

The present invention relates to a magnetic object detecting system for an automated guided vehicle system (AGVS) in which at least one mobile vehicle is guided along a traffic path.

AGVS's have been used in many fields of industry. For example, automated guided vehicles are used in transporting semiconductor wafers within factories in the semiconductor industry.

In AGVS, a magnetic strip of magnetic material such as iron ferrite is installed to form a guide lane, and a detection system for detecting the strip is provided to a vehicle to be guided. Thus, the vehicle moves along the magnetic strip by detecting the magnetic strip. The above detection system is usually comprised of a magnetic-field generating coil and a pair of magnetic-field detection coils. When the vehicle is moving along the magnetic strip, both of the magnetic-field detection coils generate relatively large voltage outputs, and when the vehicle does not trace the magnetic strip, at least one of the pair of detection coils produces a small voltage output. These outputs from the pair of detection coils are applied to a steering system of the vehicle and the steering system moves the vehicle so as to make the voltage outputs of the pair of detection coils. Heretofore, the above magnetic-field generating coil is of an air core type and hence the magnetic field generated by the magnetic-field generating coil is distributed broadly over both sides of the generating coil. Therefore, the generating coil produces a magnetic-field not only in the space under the coil but also in the space over the coil. Accordingly, in the case where some magnetic material such as iron as steel is present over the magnetic strip, the detection system erroneously recognizes such magnetic material as the magnetic strip, resulting in malfunction.

Furthermore, a magnetic field generated by the air-core type magnetic-field generating coil spreads over a broad area and change in intensity of the magnetic field is very gradual. Therefore, the detection coils are required to have high sensitivity. This means that the pair of detection coils must be large in size.

As described, the prior art detection system has been limited in detection sensitivity and inevitably large in size.

SUMMARY OF THE INVENTION

It is an object of the present invention to provide a magnetic object detecting circuit having high sensitivity without being affected by outer noise.

It is another object of the present invention to provide a magnetic object detecting circuit which can be fabricated in a reduced size.

The magnetic object detection system according to the present invention is of the type having a magnetic field generating coil for generating a magnetic field and a pair of detection coils for detecting the intensity of magnetic field between the magnetic field generating coil and a magnetic object to be detected, and the magnetic field generating coil includes a magnetic core having two ends and the detection coils are located near the ends of the generating coil, respectively.

According to the present invention, distribution of the magnetic field is limited to the space between the ends of the magnetic core and the magnetic object. Therefore, the detection coils receive the concentrated magnetic field around themselves. Also, since no magnetic field is distributed over the generating coil, the detection system is not affected by peripheral conditions.

DETAILED DESCRIPTION OF THE INVENTION

Figure 1:
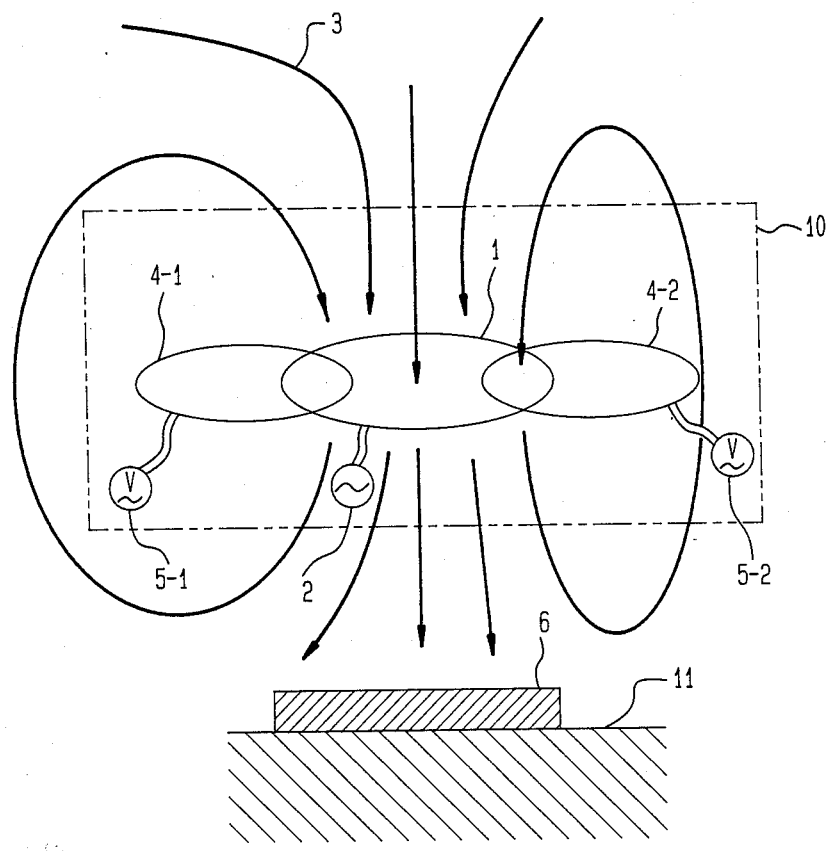
FIG. 1 is a perspective diagram showing a basic structure of AGVS according to prior art.

Referring to FIG. 1, a conventional AGVS is explained. Magnetic belt 6 made of ferrite is installed on the floor or road 11 as a guiding lane. A vehicle 10 includes a detection system composed of a stimulation coil 1 and a pair of detection coils 4-1 and 4-2 arranged at both sides of the stimulation coil 1. A high frequency voltage source 2 provides the stimulation coil 1 with an AC voltage. The stimulation coil 1 is of an air core or non-magnetic core type and generates a magnetic field 3 towards coil 1. Voltage detector circuits 5-1 and 5-2 are coupled to the detection coils 4-1 and 4-2, and detect voltages induced at the coils 4-1 and 4-2, respectively. When the vehicle 10 is located just above the magnetic belt 6, both the voltage detectors 5-1 and 5-2 produce the same large output. When the vehicle 10 is located aside from the magnetic belt 6, the voltage outputs of the voltage detectors 5-1 and 5-2 are unbalanced. In this instance, a steering system (not shown) in the vehicle 10 makes the vehicle 10 move so as to render the outputs of the detectors 5-1 and 5-2 balanced.

However, since the stimulation coil 1 is of the air core or non-magnetic type, the magnetic field generated by the coil 1 spreads broadly in both the up and down directions. Therefore, in the case where some magnetic substance is present above the vehicle 10, such magnetic substance affects the magnetic field like the magnetic belt 6 and hence the detectors 5-1 and 5-2 recognize such magnetic substance as the magnetic belt 6, resulting in malfunction. Furthermore, magnetic field 3 spreads broadly and changes in the magnetic field due to the presence of magnetic material, i.e. magnetic gradient are relatively small. Accordingly, change in the outputs of the detectors 5-1 and 5-2 is inevitably small. Otherwise, the order to obtain large outputs in the detectors, the detection coils 4-1 and 4-2 must be large in size. However, the space assigned to the detection system in the vehicle is limited and the above solution is not practical.

Figure 2:
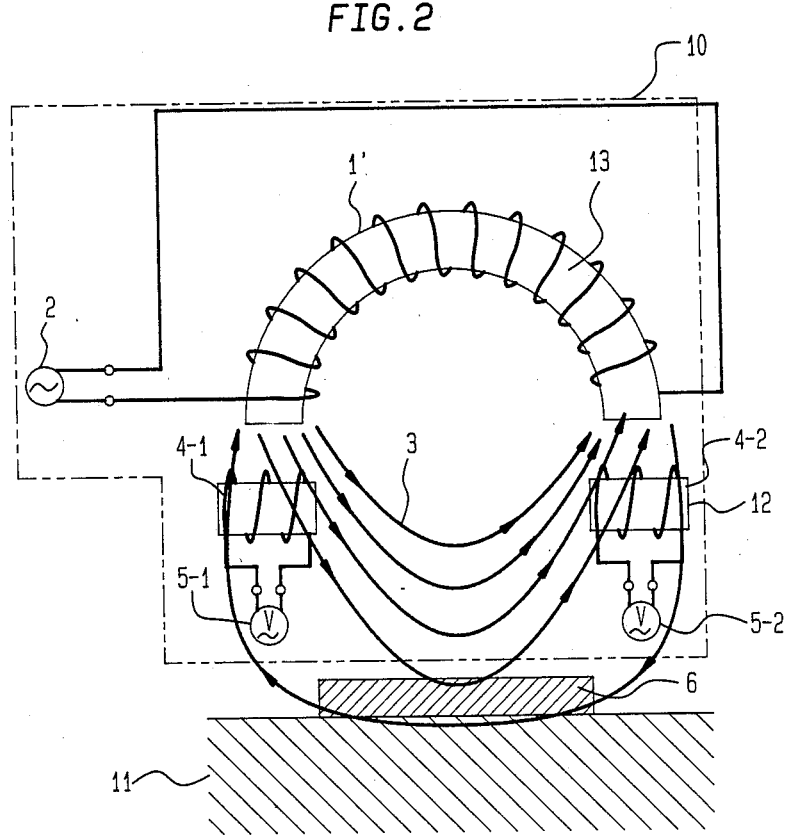
FIG. 2 is a diagram of a major part of AGVS according to a first embodiment of the present invention.

Referring to FIG. 2, a detection system for AGVS according to the present invention is explained.

In the drawings, portions corresponding to those in FIG. 1 are designated by similar reference numerals.

According to the invention, in place of the air core coil 1 in FIG. 1, a magnetic core type coil 1' includes a magnetic core 13 of magnetic material having large magnetic permeability such as ferrite or Permalloy. The core 13 is approximately formed in a "U" shape and both ends of the core 13 are facing towards the base 11 such as the floor or road.

The detection coils 4-1 and 4-2 are of a magnetic core type having a magnetic core 12 and arranged near the ends of the core 13 of the stimulation coil 1', respectively.

According to this arrangement, magnetic field 3 is generated only on the lower side of the stimulation coil 1'. In other words, magnetic field 3 is effectively concentrated around the magnetic belt 6 while no magnetic field is generated at the upper side of the coil 1'. The distance between the ends of the magnetic core 13 is set larger than the width of the magnetic belt 6, as illustrated.

According to this arrangement, since distribution of the magnetic field is limited, the detection system is not disturbed or affected by magnetic substances located over the vehicle 10. Furthermore, the magnetic field 3 is concentrated near the magnetic belt 6 to be detected, and hence, change in intensity of the magnetic field around the detection coils 4-1 and 4-2 due to the distance between the coil 1' and the magnetic belt 6 is large. Thus, hig sensitivity is achieved in detection.

Figure 3:
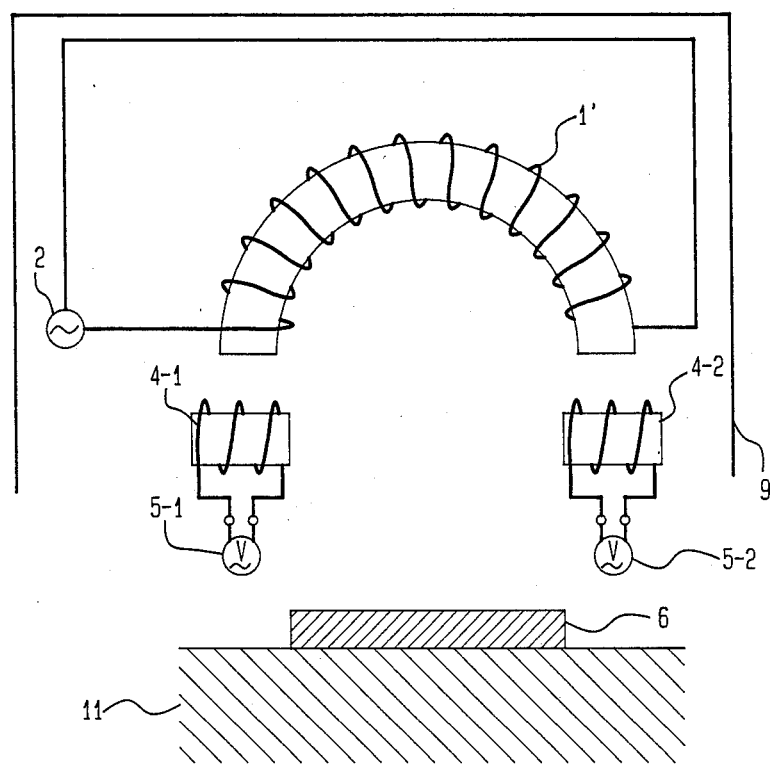
FIG. 3 is a diagram of a second embodiment of the present invention.

FIG. 3 shows a second embodiment of the invention. This embodiment illustrates that a shielding case 9 is employed to cover the upper side of the detection system (the coil 1', the detectio coils 4-1, 4-2). According to this embodiment, the detection coils 4-1 and 4-2 ae isolated from outer magnetic noise.

Figure 4:
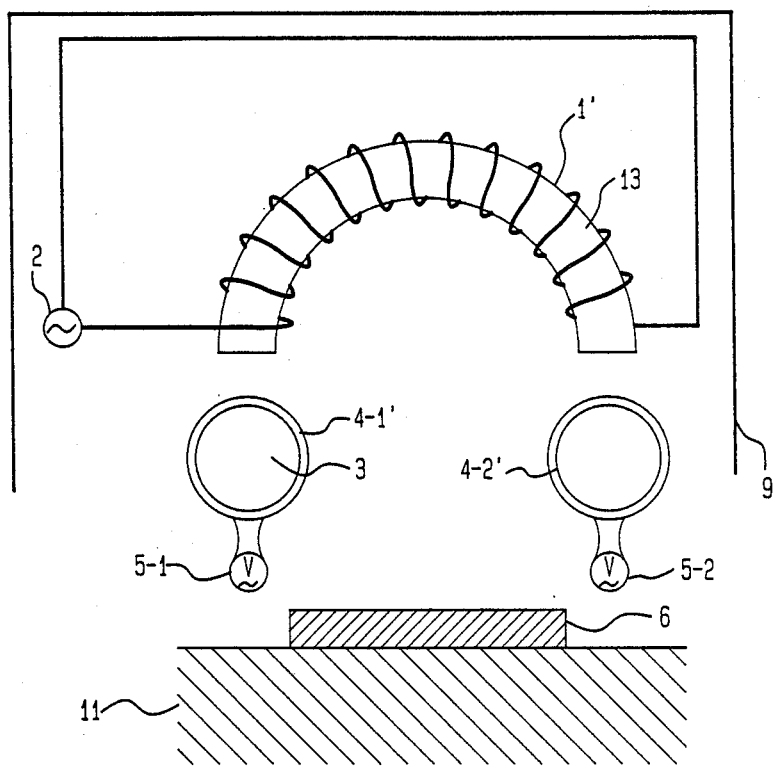
FIG. 4 is a diagram of a third embodiment of the present invention.

FIG. 4 shows a third embodiment of the invention. In this embodiment, in place of the detection coils 4-1 and 4-2 of a magnetic core type, air core type coils 4-1' and 4-2' are employed. The detection coils 4-1' and 4-2' are arranged in vertical direction. Namely, axes of the coils 4-1' and 4-2' are normal to the end surfaces of the core 13.

Figure 5A:
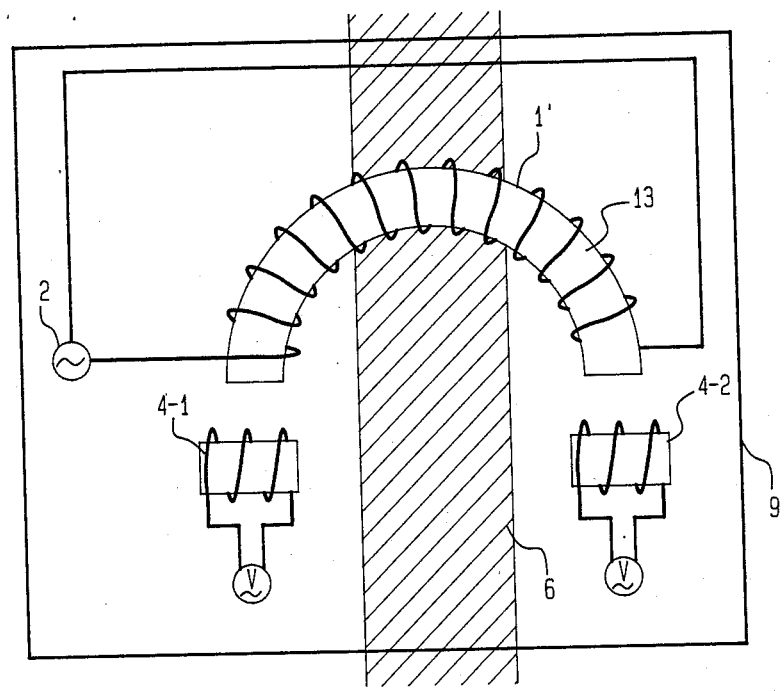
FIGS. 5A and 5B are diagrams.
Figure 5B:
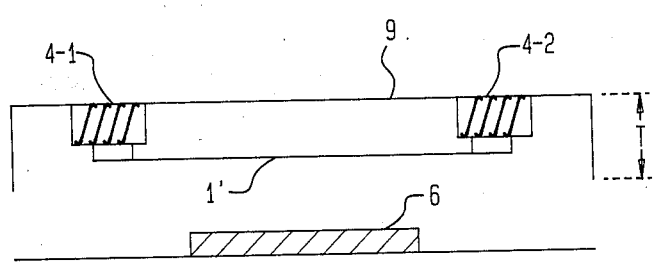

FIG. 5A shows a plan view of a fourth embodiment of the invention, and FIG. 5B shows a vertical view of FIG. 5A. This embodiment illustrates that the stimulation coil 1' is laid out in the horizontal direction. Namely, axes of the ends of the magnetic core 13 and the plane of the magnetic belt 6 are parallel. This arrangement is advantageous for the case where a height "T" of the detection system is limited.

In the above embodiments of FIGS. 1 to 5, the magnetic belt 6 as a magnetic marker is formed of ferrite composite by mixing by-product ferrite and resin. The ferrite content in this case is about 60% to 90% of the weight. In this case, saturation magnetization is about 0.15 (Wb/m$^2$), and relative permeability is about 5. A large amount of by-product ferrite results from mineral processing, as in the mining and purifying process for iron and titanium. By-product ferrite is also produced in the treatment of waste water, including heavy metal ions, by precipitating them as ferrite compounds. This by-produce ferrite has usually been thrown away.

Figure 6:
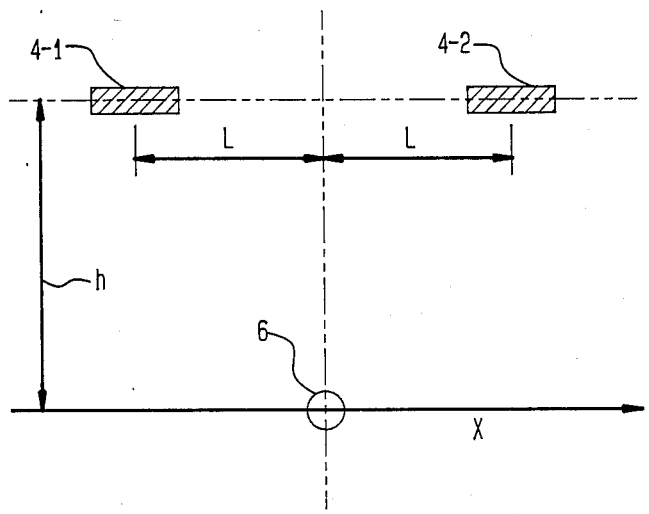
FIG. 6 is a diagram showing a problem in the detecting system.
Figure 7:
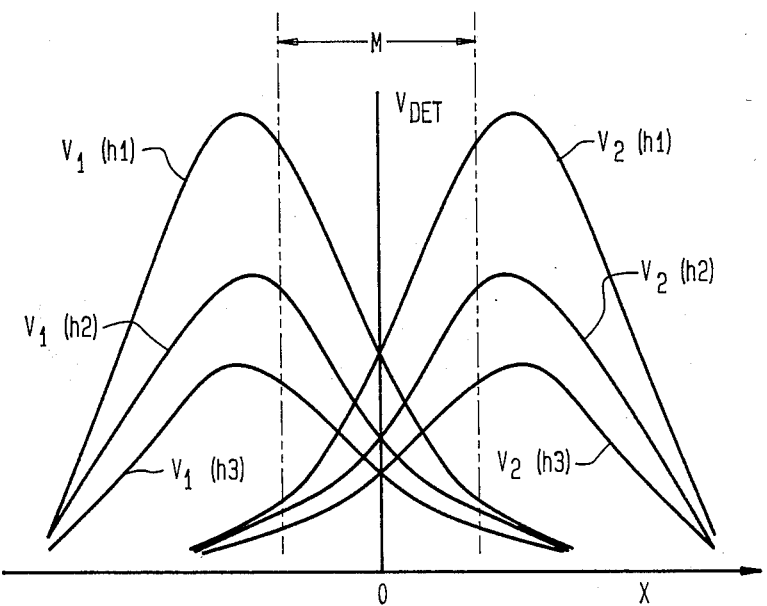
FIG. 7 is a diagram showing operation of the detecting system.

A vertical arrangement of the detection coils 4-1 and 4-2 and the magnetic belt 6 is shown in FIG. 6, in which "h" indicates height of the detection coils 4-1 and 4-2 from the surface of the magnetic belt 6 and "X" indicates lateral deviation. In the practical case, the height h frequently varies dependent on weight loaded on the vehicle. According to changes in the height h, voltages induced at the detection coils 4-1 and 4-2 vary, as shown in FIG. 7. FIG. 7 shows output voltages ($V_{DET}$) from the detection circuits 5-1 and 5-2 with respect to X and h. Waveforms $V_1(h_1)$, $V_1(h_2)$ and $V_1(h_3)$ show output voltage from the left side detection circuit 5-1 at height $h_1$, $h_2$ and $h_3$ ($h_1 < h_2 < h_3$), respectively, while waveforms $V_2(h_1)$, $V_2(h_2)$ and $V_3(h_3)$ show output voltage from the right side detection circuit 5-2 at height $h_1$, $h_2$ and $h_3$, repsectively. As is clear from FIG. 7, it is conceivable that the output voltage $V_{DET}$ changes abruptly due to the height of the detection coils. Therefore, the output voltages $V_1$, $V_2$ are affected by the height and do not correctly show the lateral deviation. Hence, it is difficult to control the steering system of the vehicle directly by the outputs of the detection circuits 5-1 and 5-2.

Figure 8:
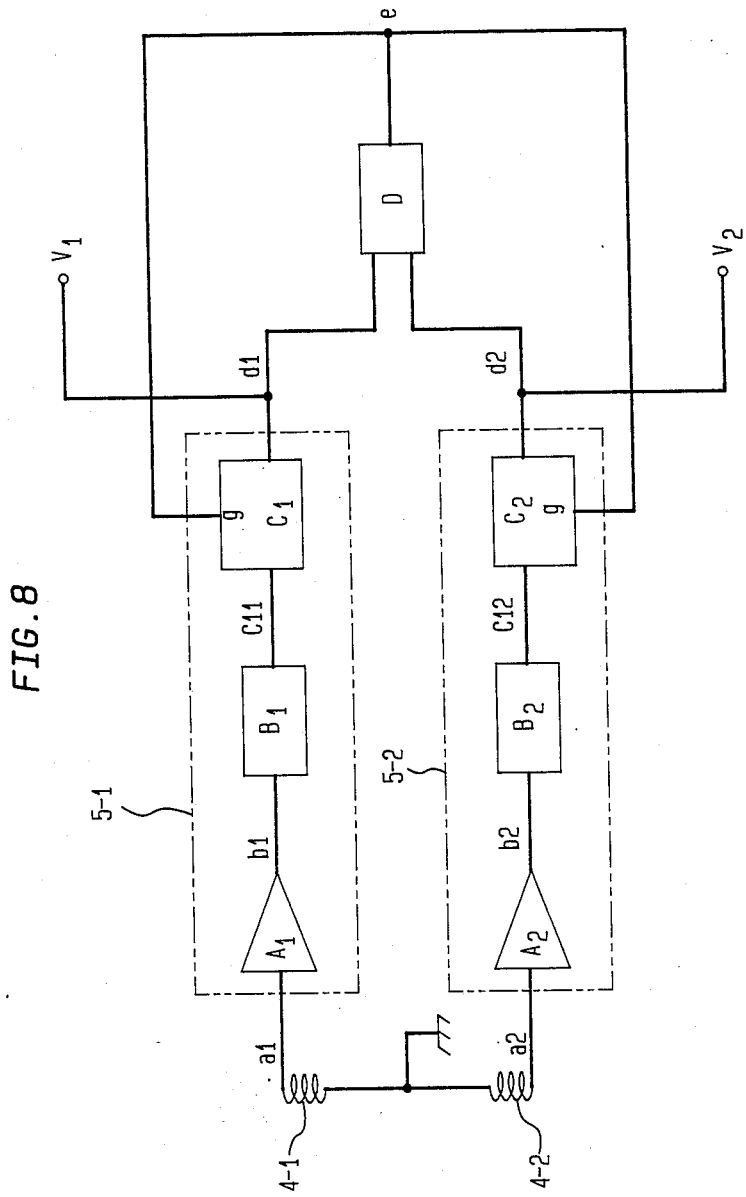
FIG. 8 is a block diagram of a preferred detecting system according to the invention.

FIG. 8 shows an improved arrangement of the detection circuits which avoid the above mentioned problem.

Figure 9:
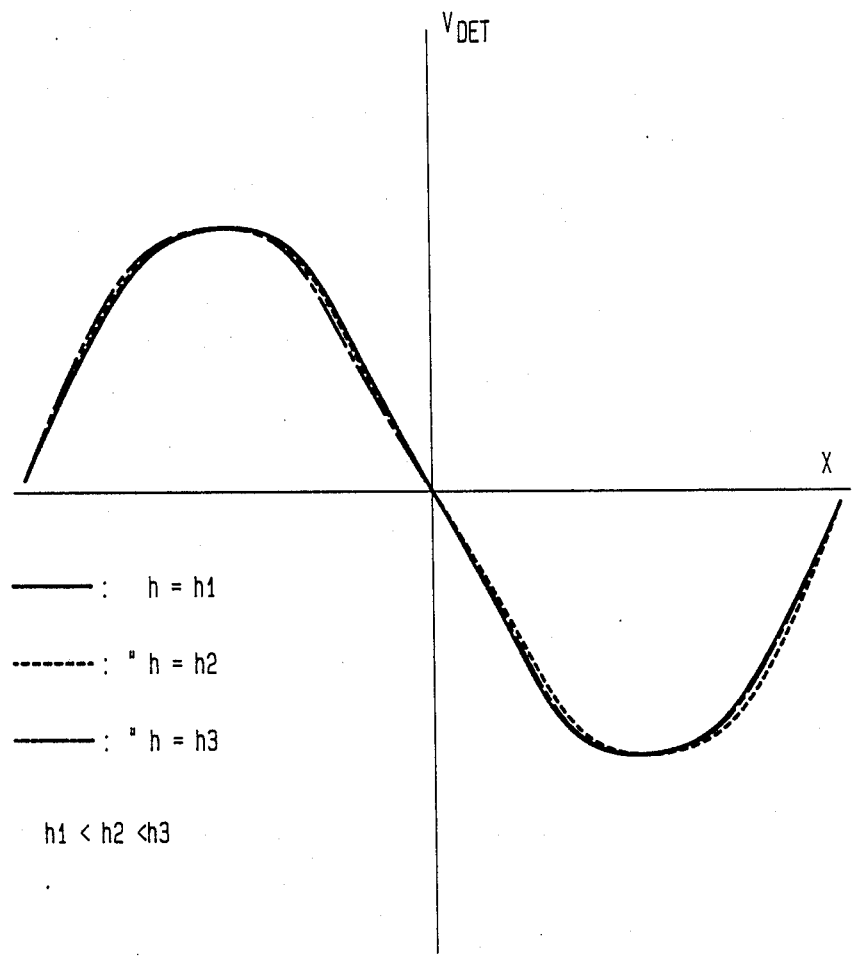
FIG. 9 is a diagram showing operation of the detecting system of FIG. 8.

T6e output of the detectio coils 4-1 and 4-2 are connected to inputs of preamplifiers $A_1$ and $A_2$. The preamplifiers $A_1$ and $A_2$ amplify the outputs of the detection coils 4-1 and 4-2, respectively. As is apparent from FIG. 7, the output characteristics of the detection coils 4-1 and 4-2 are the same with respect to the deviation from a center position "0" in the X axis. Thus, the amplifiers $A_1$ and $A_2$ generate the amplified outputs of the detection coils 4-1 and 4-2, respectively. Rectifier circuits $B_1$ and $B_2$ convert the outputs $b_1$ and $b_2$ of the preamplifiers $A_1$ and $A_2$ into DC signals $C_{11}$ and $C_{12}$, respectively. The DC signals $C_{11}$ and $C_{12}$ are applied to variable gain amplifiers $C_1$ and $C_2$ whose gain (amplification factor) are controlled by signals applied to control terminals g. The variable gain amplifiers $C_1$ and $C_2$ may be known AGC amplifiers whose gains are controlled by AGC terminals thereof. Examples of such AGC amplifiers are disclosed in U.S. Pat. Nos. 3,210,683 and 4,065,725. The outputs $d_1$ and $d_2$ of the amplifiers $C_1$ and $C_2$ are derived as the outputs $V_1$ and $V_2$ of the detection circuits 5-1 and 5-2. Also, the outputs $d_1$ and $d_2$ are input to a voltage adding circuit D which generates a voltage e in proportion to the sum $(d_1+d_2)$ of the outputs $d_1$ and $d_2$. The voltage e of the adding circuit D is applied to the control terminals g of the amplifiers $C_1$ and $C_2$. The gains of the amplifiers $C_1$ and $C_2$ are similarly controlled by the voltage e at the same rate so as to keep the value of the voltage e at a predetermined value. Thus, the output voltages $V_1$ and $V_2$ which are free from the value of the height h are produced, as shown in FIG. 9. FIG. 9 shows the value of the output voltage $V_1$, $V_2$ with respect to X for three different heights $h_1$, $h_2$ and $h_3$.

As has been described above, the present invention provides a novel and useful detectio system for AGVS.

We claim:

1. A system for detecting an object including a magnetic material, said system comprising a first coil for generating a magnetic field that is directed towards said object, second and third coils arranged in a magnetic field path generated by said first coil at separate positions, said first coil including a magnetic core having first and second ends, said first and second ends being arranged near said second and third coils respectively, said magnetic core being formed substantially in a U shape, a first amplifier for amplifying an output of said second coil, a second amplifier for amplifying an output of said third coil, each of said first and second amplifiers having a gain control terminal for controlling a gain thereof, adding means for obtaining an addition signal proportional to the sum of outputs of said first and second amplifiers, and means for applying said addition signal to said gain control terminals of said first and second amplifiers thereby to control gains of said amplifiers, whereby said addition signal is kept at a predetermined value.

2. A system comprising a guide lane including a magnetic material, and a vehicle moving along said guide lane, said vehicle including a position detecting circuit including a first coil for generating a magnetic field towards said guide lane, second and third coils arranged between said first coil and said guide lane and control means responsive to outputs of said second and third coils for controlling direction of said vehicle so as to move along said guide lane, said first coil including a magnetic coil having a first end located near and second coil and a second end located near said third coil, said control means including gain control terminals on a first and a second amplifier connected for amplifying outputs of said second and third coils, respectively, to control gains of said amplifiers.

3. A system for detecting an object including a magnetic material, said system comprising a first coil for generating a magnetic field towards said object and second and third coils arrnaged in a magnetic field path generated by said first coil at separate positions, said first coil having a magnetic core including first and second ends, said first and second ends being arranged near said second and third coils respectively, a first amplifier for amplifying an output of said second coil, a second amplifier for amplifying an output of said third coil, each of said first and second amplifiers having a gain control terminal for controlling a gain thereof, adding means for obtaining an addition signal proportional to the sum of outputs of said first and second amplifiers, and means for applying said addition signal to said gain control terminals of said first and second terminals thereby to keep said addition signal at a predetermined value.

4. A system for detecting an object of magnetic material comprising a first coil for generating a magnetic field that is directed towards said object, and second and third coils arranged between said first coil and said object, said first coil including a first magnetic core having a first end located near said second coil and a second end located near said third coil, said second and third coils including second and third magnetic cores physically separated from said first magnetic core, a first amplifier for amplifying an output of said second coil, a second amplifier for amplifying an output of said third coil, each of said first and second amplifiers having a gain control terminal for controlling a gain thereof, adding means for obtaining an addition signal proportional to the sum of outputs of said first and second amplifiers, and means for applying said addition signal to said gain control terminals of said first and second amplifiers thereby to keep said addition signal at a predetermined value.

* * * * *